United States Patent [19]
Reynolds

[11] Patent Number: 5,014,416

[45] Date of Patent: May 14, 1991

[54] SINGLE LINE, AUTOMATIC KEY PROGRAMMING AND CONNECTOR TRANSFER SYSTEM

[75] Inventor: Charles E. Reynolds, Mechanicsburg, Pa.

[73] Assignee: AMP Incorporated, Harrisburg, Pa.

[21] Appl. No.: 453,076

[22] Filed: Dec. 19, 1989

Related U.S. Application Data

[63] Continuation of Ser. No. 168,789, Mar. 15, 1988, abandoned.

[51] Int. Cl.[5] .......... B23P 19/04

[52] U.S. Cl. .......... 29/701; 29/742; 29/795

[58] Field of Search .......... 29/240, 428, 429, 430, 29/701, 742, 791, 795, 809, 813, 822, 823

[56] References Cited

U.S. PATENT DOCUMENTS

| | | | |
|---|---|---|---|
| 3,061,147 | 10/1962 | Vilmerding | 29/809 X |
| 3,448,507 | 6/1969 | Jackson et al. | 29/809 |
| 3,474,395 | 10/1969 | Ferdon et al. . | |
| 3,518,620 | 6/1970 | Bushey et al. . | |
| 3,562,696 | 2/1971 | Barnhart et al. | 339/60 |
| 3,611,272 | 10/1971 | Fairbairn et al. | 339/184 |
| 3,851,369 | 12/1974 | Eschholz | 29/809 X |
| 3,873,172 | 3/1975 | Paullus | 339/17 |
| 4,376,565 | 3/1983 | Bird et al. | 339/186 |
| 4,448,467 | 5/1984 | Weidler | 339/17 |
| 4,449,767 | 5/1984 | Weidler | 339/17 |
| 4,580,868 | 4/1986 | Verstijnen | 339/186 |
| 4,587,703 | 5/1986 | Azizi et al. | 29/822 X |
| 4,595,250 | 6/1986 | Joly et al. | 339/17 |
| 4,653,185 | 3/1987 | Kajima et al. | 29/809 |

FOREIGN PATENT DOCUMENTS

| | | | |
|---|---|---|---|
| 0110487 | 12/1983 | European Pat. Off. . | |
| 135323 | 5/1979 | Fed. Rep. of Germany | 29/813 |
| 94234 | 5/1985 | Japan | 29/701 |
| 80 00935 | 5/1980 | PCT Int'l Appl. | 29/813 |
| 84 04210 | 10/1984 | PCT Int'l Appl. . | |
| 1292972 | 2/1987 | U.S.S.R. | 29/701 |
| 1066672 | 4/1967 | United Kingdom . | |

OTHER PUBLICATIONS

One Page Document Entitled "Insertion Error-Proof Board-To-Board Cable Connector".
Amp Instruction Sheet IS7482, Rel. 03/26/84.
EPO Standard Search Report, DTD 01/11/89.
Standard Search Report Annex.

*Primary Examiner*—Joseph M. Gorski
*Attorney, Agent, or Firm*—David L. Smith

[57] ABSTRACT

An automatic key programming and connector transfer system and method for electrical connectors (10) having keying means (40) thereon. According to one aspect of the invention, an automatic key programming apparatus (51) for electrical connectors (10) is provided which comprises a supply station (56) for storing a plurality of connectors (10) having keys oriented in a predetermined orientation, a programming station (57) for receiving connector (10) having keys oriented in a predetermined orientation from the supply station (56) and for programming the keys of the connectors, the programming station (57) including a programming device (100) for programming the keys of the connectors (10) in accordance with programming instructions applied thereto, and an output station (58) for receiving connectors (10) having programmed keys from the programming station (57). According to a further aspect of the invention, the system also includes a robotic transfer apparatus (52) for automatically picking up connectors (10) having programmed keys from the output station (58) of the programming apparatus (51) and for transferring the connectors (10) to a printed circuit board or other utilization device (53). The invention permits connectors (10) having keys oriented in a predetermined orientation to be programmed one at a time to a desired orientation, and then transferred and positioned on a printed circuit board or other utilization device (53) automatically without human intervention.

16 Claims, 5 Drawing Sheets

SINGLE LINE, AUTOMATIC KEY PROGRAMMING AND CONNECTOR TRANSFER SYSTEM

This application is a continuation of application Ser. No. 07/168,789 filed Mar. 15, 1988, now abandoned.

BACKGROUND OF THE INVENTION

The present invention relates generally to the field of electrical connectors, and, more particularly, to an automatic key programming and connector transfer system and method for electrical connectors which have keying means thereon.

Electrical connectors are frequently provided with keying means to permit particular pairs of connectors to properly mate and to prevent the mating of connectors which are not intended to be mated. Keying means are especially useful when a plurality of otherwise identical connectors is positioned in close proximity to one another, for example, on a printed circuit board. The incorrect matching of complementary connectors to the connectors on the board can cause serious damage to the circuits improperly connected thereby; and the keying means, by ensuring that each complementary connector will mate with only the correct one of the plurality of connectors on the board, minimizes the risk of improper connection. Keying means are particularly important when the connections are made by untrained personnel as the risk of improper connection is especially great in such circumstances.

Keying systems are known in which a key is secured in one of a pair of complementary connectors and is adapted to cooperate with an opposing key secured in the other of the pair of connectors. Each key is secured in an associated connector in a selected orientation with respect to its opposing key so that when the connectors are intended to be mated, extended keying portions on the keys pass by each other during mating to allow the connectors to properly mate. If one of the keys is secured in an incorrect orientation with respect to its opposing key, however, the extended keying portions on the keys abut one another during attempted mating to prevent proper mating of the connectors.

One known type of key includes a portion having a polygonal cross section and is adapted to be secured within a passageway in a connector in a selected orientation. The number of sides of the polygonal shape determines the number of possible orientations of the key.

Sometimes keys of connectors are programmed in the factory by the connector manufacturer and the connectors with programmed keys are shipped to the customer with the keys preprogrammed in a variety of orientations. At other times, the connectors are shipped to the customer with the keys in an unprogrammed condition, and the customer programs the keys of the connectors by inserting and then securing the keys in the connector passageways in the selected orientations prior to mounting the connectors to printed circuit boards or other utilization devices. Whether performed by the manufacturer or the customer, programming the keys of a connector and positioning the connector having programmed keys on a printed circuit board are typically performed by hand, and are time-consuming procedures that are susceptible to human error. The programming of the keys of small connectors is particularly troublesome inasmuch as the keys also tend to be quite small and rather difficult to handle.

SUMMARY OF THE INVENTION

According to one aspect of the invention, an automatic key programming apparatus for electrical connectors is provided which comprises a supply station for storing a plurality of connectors having keys in an unprogrammed state; a programming station for receiving connectors having keys in an unprogrammed state from the supply station and for programming the keys of the connectors, the programming station including a programming device for programming the keys of the connectors in accordance with programming instructions applied thereto; and an output station for receiving connectors having programmed keys from the programming station.

According to a presently preferred embodiment, the single line automatic key programming apparatus of the invention is particularly designed for use with connectors which have at least one key mountable thereon in a programmable first position whereby the key may be rotated to any selected one of a plurality of orientations, and, thereafter, moved to a programmed second position in which the key is secured in the connector in the selected orientation. The supply station includes means for storing a plurality of connectors having keys in an unprogrammed state mounted thereon in the programmable first position, and first delivery means for delivering the connectors having unprogrammed keys, one at a time, to the programming station. The programming station includes a programming device which first rotates the keys to a selected orientation in accordance with the programming instructions applied thereto, and then locks the keys in the connectors in the programmed second position; and second delivery means for thereafter delivering the programmed connectors, one at a time, to the output station. The output station includes a chute for receiving and holding the connectors having programmed keys until they are picked-up for transfer to a utilization device.

The first and second delivery means preferably include inclined paths for delivering connectors from the supply station to the programming station and from the programming station to the output station by gravity whereby the connectors move from one station to the next in an efficient and reliable manner during operation of the apparatus.

According to a further aspect of the invention, the automatic key programming apparatus is incorporated within an automatic programming and connector transfer system which also includes robotic transfer apparatus for automatically transferring a connector having programmed keys from the programming apparatus to a printed circuit board or other utilization device. More particularly, the robotic transfer apparatus is designed to pick-up a connector having programmed keys from the output station of the programming apparatus and to transfer the connector to and position the connector on a utilization device.

Preferably, the robotic transfer apparatus also includes means for providing the programming instructions to the programming device in the programming station to program the keys of the connectors therein. More particularly, when a connector having programmed keys has been properly positioned on a utilization device by the robotic transfer apparatus, the robotic transfer apparatus then instructs the programming device to program the keys of the next connector (which, preferably, has already been delivered to the programming station by the first delivery means) in the manner described to the key orientation required for the next connector that is to be positioned. By the time the robotic transfer apparatus has returned to the output station, the keys of the next connector will have been properly programmed and the connector delivered to the output station by the second delivery means.

The programming instructions can be provided in an internal buffer in the programming station; however, by including the means for providing the programming instructions in the robotic transfer apparatus, the robotic transfer apparatus is able to modify the programming instructions when necessary to compensate for dropped connectors or connectors which are unable to be positioned on the utilization device after a predetermined number of attempts.

With the automatic key programming and connector transfer system of the present invention, connectors containing keys in an unprogrammed orientation have the keys programmed to a desired orientation; the connector is then positioned at a desired location on a utilization device in an efficient, substantially automated manner without operator intervention.

Further advantages and specific details of the invention will become apparent hereinafter in conjunction with the following detailed description of a presently preferred embodiment.

DETAILED DESCRIPTION OF THE PREFERRED EMBODIMENT

Figure 1:
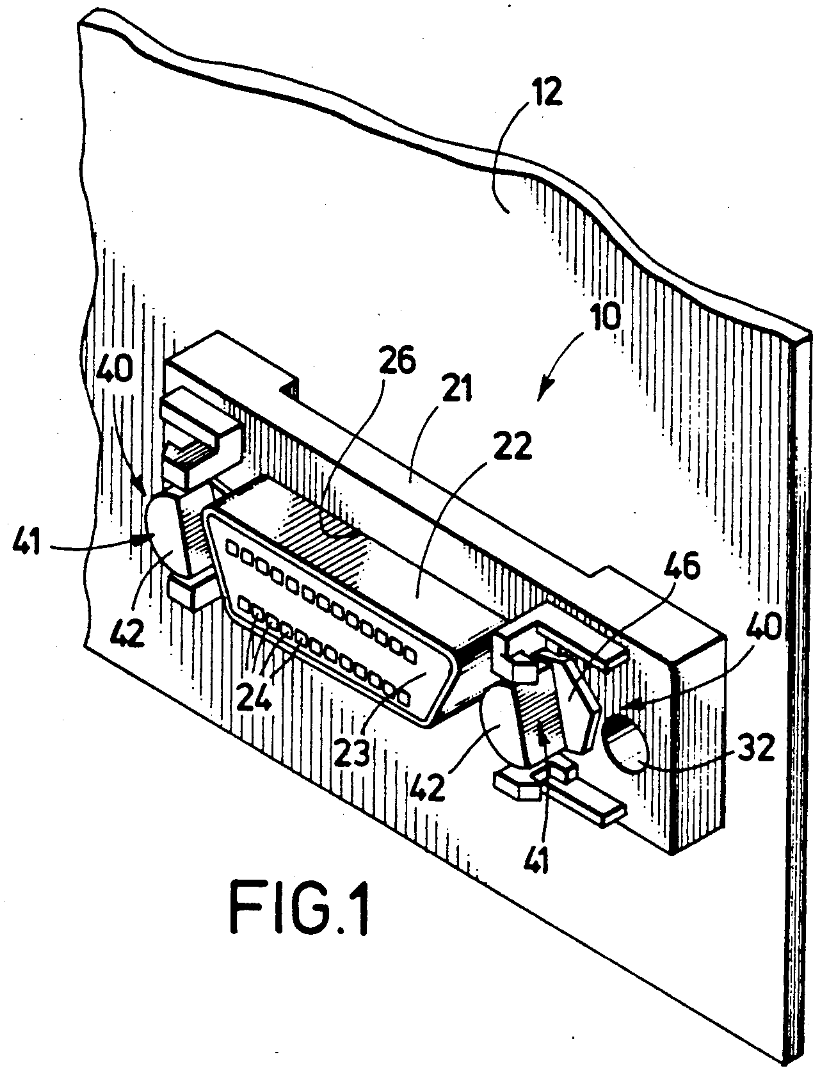
FIG. 1 illustrates an electrical connector assembly having programmable keys with which the automatic key programming and connector transfer system of the present invention may be utilized.

FIG. 1 illustrates an electrical connector 10 having programmable keys, with which the automatic key programming and connector transfer system of the present invention may be utilized. Connector 10 includes a housing 21, a drawn metal shroud 22, and a header 23 of a suitable insulating material. Header 23 has a plurality of passageways 24 extending therethrough for receiving female contacts (not shown) and is supported within shroud 22. Shroud 22 is, in turn, supported within D-shaped polarizing aperture 26 in housing 21 to form connector 10.

Connector 10 is adapted to be mounted to a printed circuit board 12 or other utilization device by extending mounting screws (not shown) through threaded mounting apertures 32 in the housing as is known to those skilled in the art.

Connector 10 is particularly designed for use in applications in which a plurality of substantially identical connectors is mounted in close proximity to one another. For example, printed circuit board 12 can comprise a panel for a computer or the like and contain a plurality of connectors 10 to permit various external equipment to be connected to the computer via complementary connectors coupled to the external equipment by cables or the like. In such applications, it is important to ensure that each connector be mated with the correct complementary connector as mismatching of connector pairs can result in damage to electrical circuits improperly connected thereby.

To ensure that each connector 10 can mate with only the correct complementary connector, the connectors include keying systems to prevent incorrect connector pairs from being mated. In particular, connector 10 includes a keying system 40 comprising a pair of keys 41 mounted adjacent opposite ends of housing 21 and which include keying portions 42 which can be positioned at any selected one of a plurality of orientations. The complementary connector similarly includes a pair of keys having keying portions which are also positioned at selected orientations, and as is known to those skilled in the art, if the keys of connector 10 and the keys of the complementary connector are properly oriented with respect to each other, the keying portions thereof pass by each other as the connectors are mated, permitting the connectors to properly mate. If, however, the keys are not properly oriented with respect to one another, the keying portions impinge against one another during attempted mating to prevent the connectors from being mated. The keying system thus permits connector 10 to mate with only the proper complementary connector and not with an incorrect complementary connector.

Figure 2A:
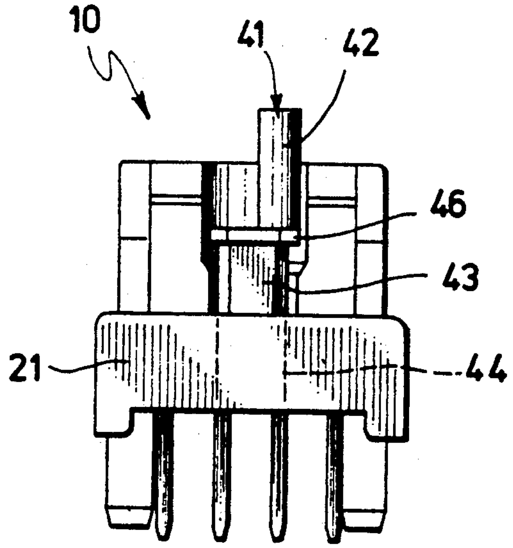
FIGS. 2A and 2B are side views of the connector assembly of FIG. 1 illustrating the keys of the connector assembly in programmable and programmed positions, respectively.
Figure 2B:
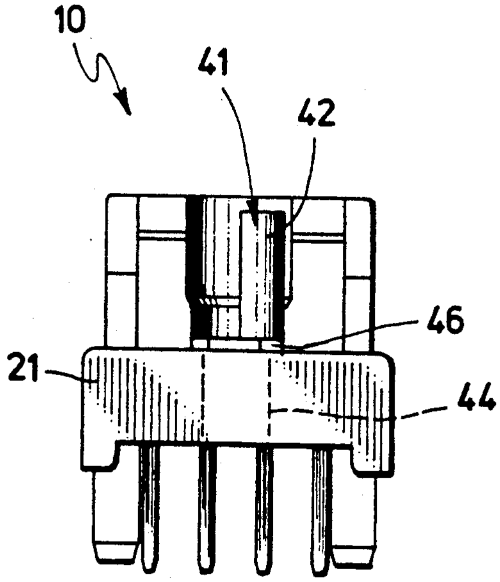

As shown in FIGS. 1, 2A and 2B, keys 41 include a polygonal-shaped body portion 46, preferably of hexagonal shape, to define as many possible key orientations as sides of the polygon. In the preferred embodiment of a hexagonal shaped body portion 46, there are six possible orientations of the keys. Keys 41 also include a keying portion 42 extending upwardly from the body portion, and a retention portion 43 extending downwardly from the body portion and adapted to extend into key-receiving passageways 44 in connector housing 21. More particularly, keys 41 are adapted to be first inserted into passageways 44 in a programmable first position, illustrated in FIG. 2A, in which the keys are partially inserted into the passageways and retained therein, typically in a predetermined orientation, such that they are capable of being rotated to orient the keying portions of the keys to any selected one of a plurality of orientations; and, thereafter, seated into a programmed second position (FIG. 2B) in which the keys are fully inserted in the passageways to lock the keys in the connector in the selected orientation.

With the keying system illustrated in FIGS. 1, 2A, and 2B, the manufacturer can insert the keys in the connector in the programmable first position illustrated in FIG. 2A and ship the assembled connector having unprogrammed keys to a customer. The customer can then program the keys of the connector by rotating the keys to a selected orientation and then locking the keys in the connector in their programmed second position illustrated in FIG. 2B prior to mounting the connector to a printed circuit board.

Connector 10 does not form a part of the present invention and is only briefly described herein to permit a clearer understanding of the programming and transfer system of the invention. Connector 10 and the keying system therefor is, however, described in greater detail in copending U.S. patent application Ser. No. 090,291 filed on Aug. 31, 1987, now U.S. Pat. No. 4,822,305, the disclosure of which is hereby incorporated by reference.

Figure 3:
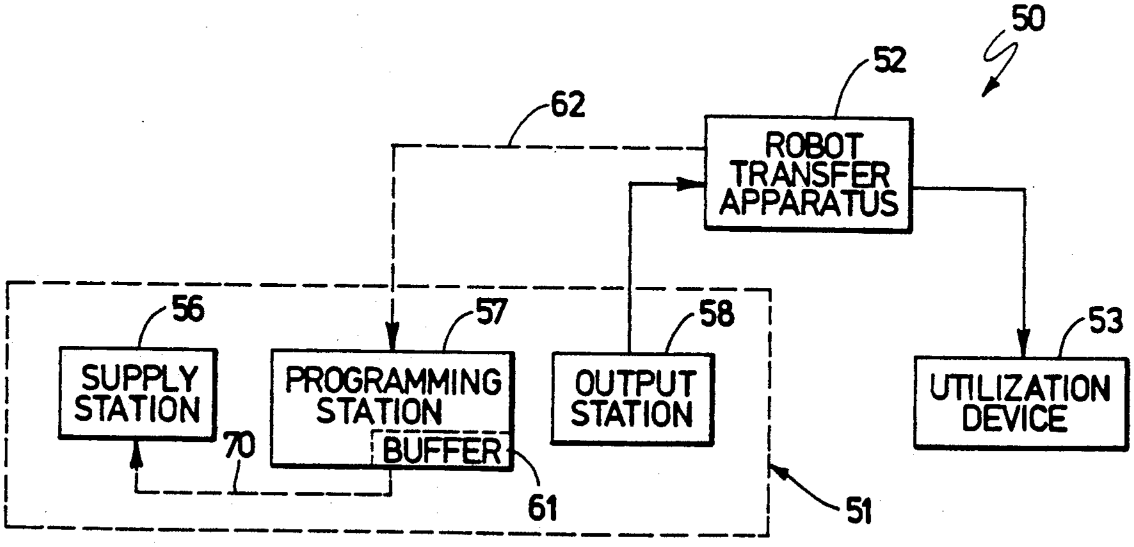
FIG. 3 schematically illustrates an automatic key programming and connector transfer system according to a presently preferred embodiment of the invention.

FIG. 3 schematically illustrates an automatic key programming and connector transfer system according to a preferred embodiment of the invention. The system is generally designated by reference numeral 50 and includes a key programming apparatus, generally designated by reference numeral 51, for programming the keys of connectors such as connector 10; and robotic transfer apparatus 52 for transferring connectors having programmed keys from programming apparatus 51 to a utilization device 53 such as a printed circuit board.

The programming apparatus includes a supply station 56 for storing a supply of connectors having keys in the programmable first position, a programming station 57 for receiving the connectors from the supply station, for programming the keys of the connectors pursuant to programming instructions, including securing the keys in the programmed second position, and an output station 58 for receiving connectors having keys secured in the programmed second position from the programming station. As will be explained more fully hereinafter, programming station 57 includes a programming device which is responsive to the programming instructions to program the keys of a connector by rotating the keys 41 thereof to a desired orientation while the keys are in the programmable first position partially inserted in passageways 44, and to thereafter seat the keys fully into passageways 44 to lock the keys in the programmed second position. The programming instructions can be stored in an internal buffer, repeatedly and sequentially cycling through the programming instructions, schematically illustrated at 61 within the programming station, or the programming device can be controlled from the robotic transfer apparatus 52 via a signal line 62.

The transfer of connectors having keys in the programmable first position from supply station 56 to programming station 57 is preferably controlled by signals from the programming station to the supply station along signal line 70.

With the system illustrated in FIG. 3, a plurality of keyed connectors having keys in the programmable first position can have the keys automatically programmed to desired orientations, with the connectors subsequently positioned on a printed circuit board or other utilization device without operator intervention and with reduced potential for error.

Figure 4:
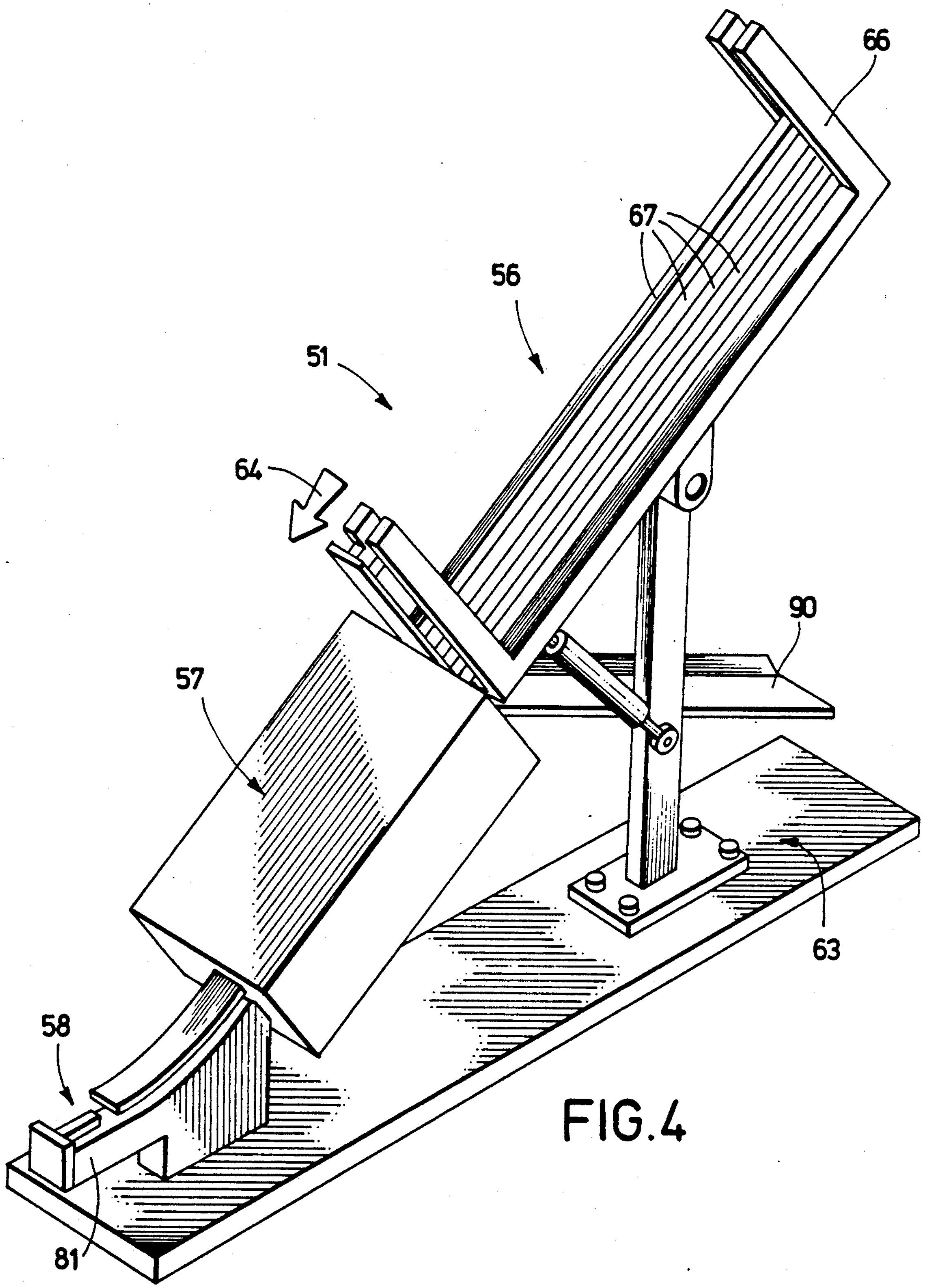
FIG. 4 illustrates the automatic key programming apparatus of the system of FIG. 3.

FIG. 4 illustrates the automatic programming apparatus 51 of automatic key programming and connector transfer system 50. Apparatus 51 includes a supply station 56, a programming station 57, and an output station 58 which are positioned in alignment with one another along an inclined path relative to a support 63. The inclined path is generally identified by arrow 64 and permits connectors to move from the supply station to the programming station and from the programming station to the output station by gravity during operation of the apparatus.

Supply station 56 comprises an inclined frame 66 configured to support a plurality of plastic tubes 67 stacked one above the other. Each tube 67 is adapted to be filled with a plurality of connectors 10 (e.g., six or more connectors) arranged in a line one behind the other within the tube (see FIGS. 5A-5D). Plastic connector tubes 67 are known in the art as a convenient means for storing and transporting connectors and need not be described in detail herein.

Connectors 10 in tubes 67 have keys 41 partially inserted in passageways 44 thereof in the unprogrammed first position. The keys in this position, although said to be unprogrammed, may be in a predetermined orientation, being placed in a predetermined orientation during manufacture of the connector assembly. The connectors are preferably arranged in the tubes with the keying portions 42 of the keys extending upwardly.

Figures 5A, 5B, 5C, 5D:
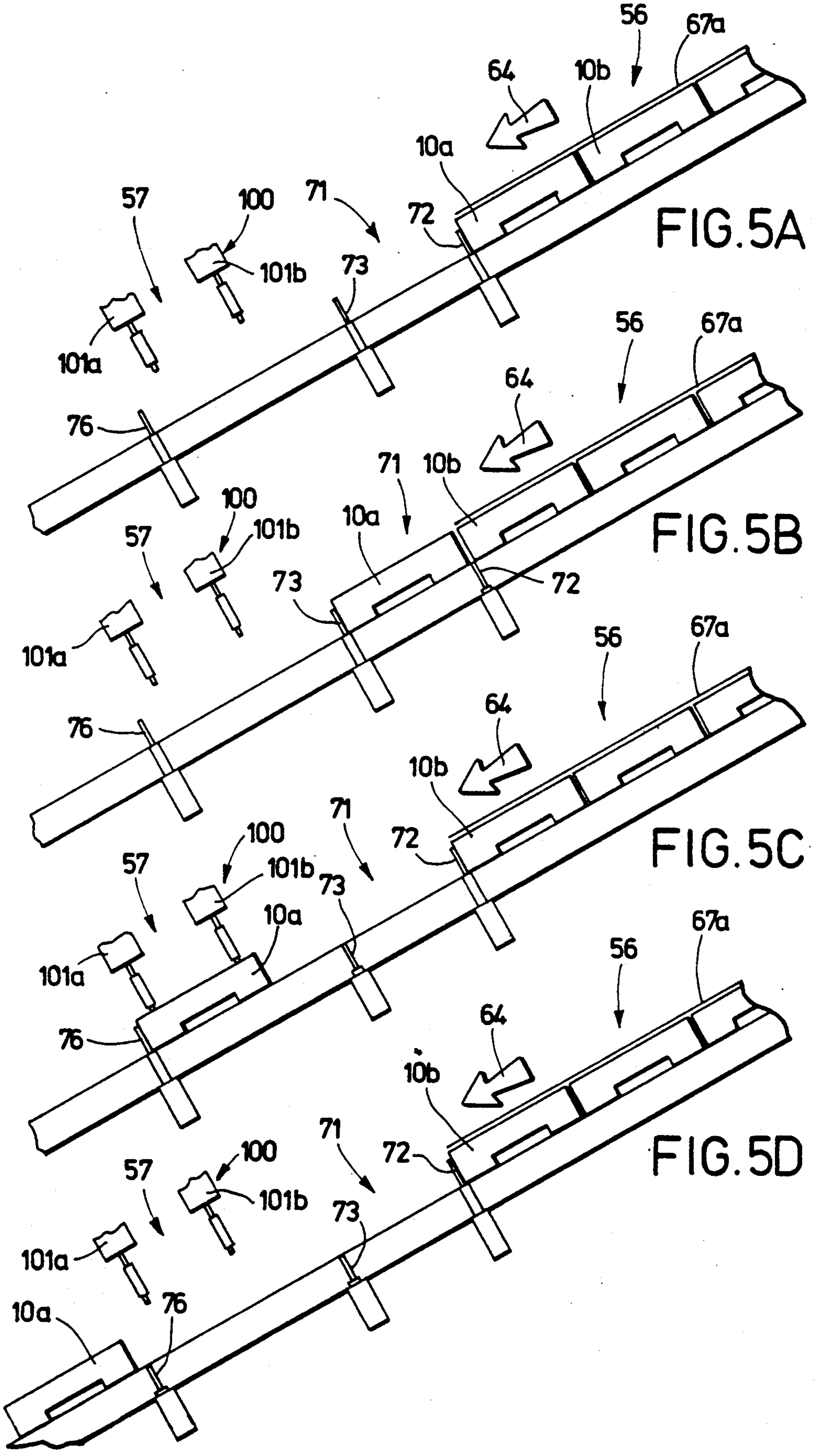
FIGS. 5A, 5B, 5C and 5D illustrate the operation of the automatic key programming apparatus of FIG. 4.

Supply station 56 also includes first delivery structure (see FIGS. 5A-5D), generally designated by reference numeral 71, for delivering connectors, one at a time, from supply station 56 to programming station 57. The first delivery structure can take various forms but in the embodiment described herein essentially comprises an escapement mechanism comprising a pair of switch-operated gates in the form of pins 72 and 73 which are adapted to move up and down in sequence to permit connectors to be delivered, one at a time, from the lowermost supply tube 67*a* in the stack of tubes 67 in supply station 56 to the programming station. More particularly, gates 72 and 73 are initially in their up position illustrated in FIG. 5A such that gate 72 blocks the front of tube 67*a* to prevent a connector from sliding out of the inclined tube by gravity. To deliver a connector from tube 67*a* to the programming station, the rear gate 72 is lowered, allowing the connectors to slide forwardly by gravity until the first connector 10*a* impinges upon front gate 73 as shown in FIG. 5B. Gate 73 is positioned approximately one connector length in front of tube 67*a* such that only the front connector 10*a* actually leaves the tube 67*a*. Rear gate 72 is then raised and, thereafter, front gate 73 is lowered as shown in FIG. 5C to permit connector 10*a* to slide by gravity into the programming station while blocking the movement of any further connectors from tube 67*a*.

Thus, first delivery structure 71 permits connectors to be delivered one at a time to programming station 57. The first delivery structure is operated by signals from the programming station on line 70 as illustrated in FIG. 3 and as will be described more fully hereinafter.

When connector 10*a* enters programming station 57, the connector is stopped in a programming position by any suitable structure such as, for example, a switch-operated gate 76. While in the programming position, the connector 10*a* is programmed by rotating the keys 41 thereof to a desired orientation; and, thereafter, seating the oriented keys fully into passageways 44 of the connector to lock the keys in their programmed second position in the connector.

Figure 6:
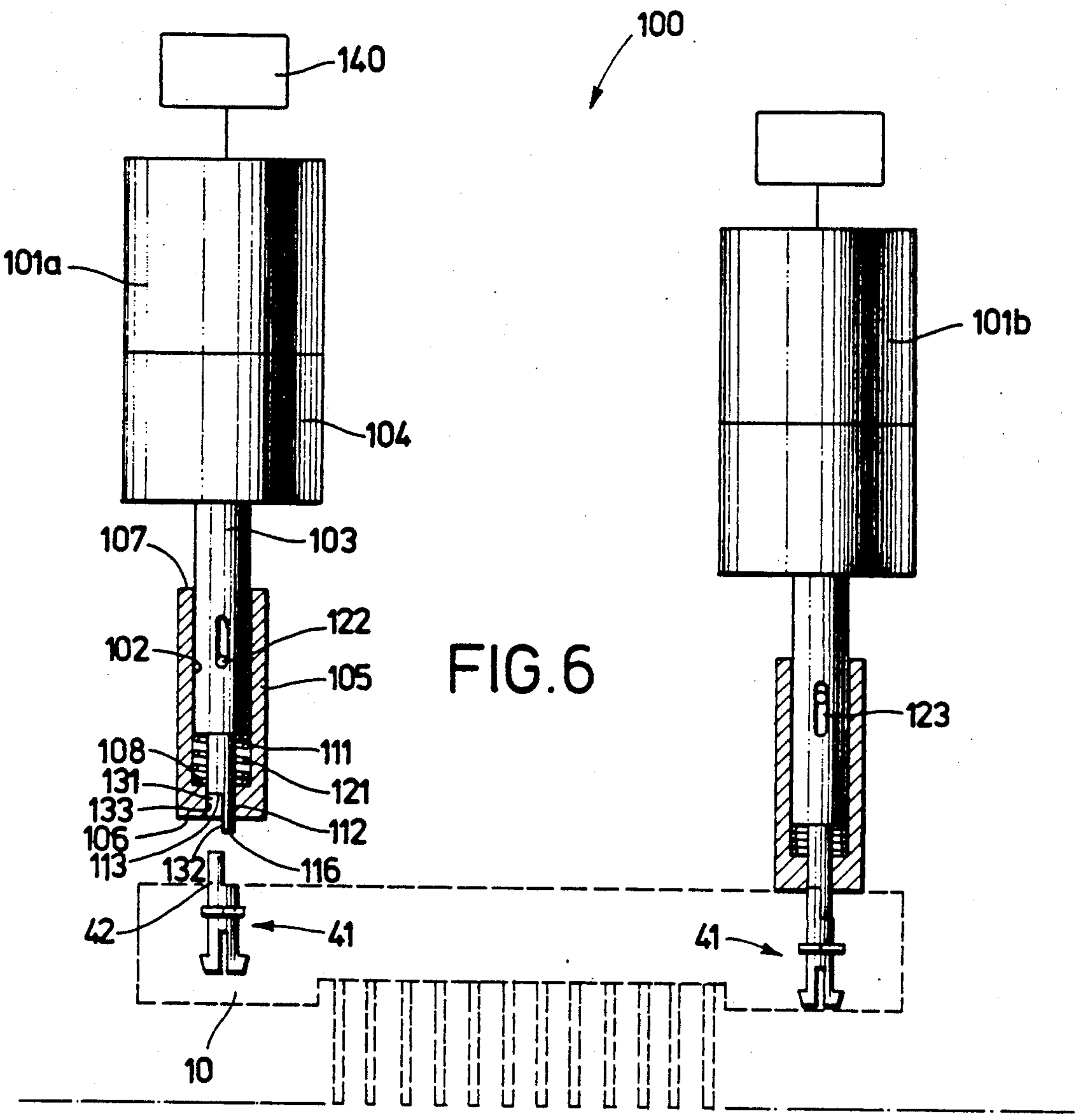
FIG. 6 illustrates the key programming device in the programming station of the automatic key programming apparatus of FIG. 4.

Programming of the keys of connector 10*a* is accomplished by a programming device 100 which comprises a pair of programming tools 101*a* and 101*b* as shown in FIG. 6. Tools 101*a* and 101*b* do not in themselves form a part of the present invention, and, accordingly are only briefly described herein. A hand tool similar to that which may be used herein is, however, described in detail in copending U.S. patent application Ser. No. 090,292 filed on Aug. 31, 1987, the disclosure of which is hereby incorporated by reference.

Tools 101*a* and 101*b* are identical and thus only tool 101*a* will be described herein. Tool 101*a* comprises a tubular-shaped sleeve 105 having an axial bore 102, an elongated cylindrical member 103 supported within sleeve 105, and a support member 104 attached to cylindrical member 103. The components can be constructed of steel or other suitable material.

Bore 102 of sleeve 105 extends from forward end face 106 to rear face 107 and includes a portion of reduced diameter adjacent its forward end to define a rearwardly facing, internal, annular shoulder 108. Member 103 is of generally cylindrical shape and is sized so as to be capable of sliding longitudinally within bore 102. Member 103 includes a cylindrical portion of slightly reduced diameter adjacent the front end thereof to define a forwardly facing shoulder 111 thereon. Member 103 also includes an extended portion 112 extending from the front face 113 thereof which is of generally semicircular cross section. Extended portion 112 defines a forwardly facing surface 116.

As shown in FIG. 6, cylindrical member 103 is adapted to extend through sleeve 105. A portion of the cylindrical member extends outwardly from rear face 107 of sleeve 105 and is adapted to be secured to support member 104 by any suitable structure.

Cylindrical member 103 is supported within sleeve 105 by resilient means, such as a spring 121. Spring 121 is positioned within sleeve 105 such that one end thereof bears against rearwardly facing shoulder 108 on sleeve 105 and the opposite end bears against forwardly facing shoulder 111 on cylindrical member 103. Spring 121 normally urges the cylindrical member rearwardly within sleeve 105 to a first retracted position illustrated in tool 101*a* in which the cylindrical member is substantially retracted within sleeve 105 (with only a small portion of extended portion 112 of member 103 extending beyond forward end face 106 of sleeve 105), but permits relative longitudinal movement of the cylindrical member relative to the sleeve.

Cylindrical member 103 is also connected to sleeve 105 by a pin 122 which extends through an elongated slot 123 in the sleeve as shown in tool 101*b*. The pin and slot arrangement permits relative axial movement between cylindrical member 103 and sleeve 105 but prevents relative rotation therebetween.

Tools 101*a* and 101*b* are used to both orient and then seat the two keys 41 of a connector 10 when the connector is positioned in the programming station. Initially, when a key 41 is in its programmable first position, a tool is positioned over the key such that extended keying portion 42 of the key is received in a space 131 that is defined between a side-facing, flat surface 132 of semi-circular, extended portion 112 of cylindrical member 103 and a sidewall 133 of the reduced diameter portion of bore 102. When the extended portion of the key is properly positioned in space 131, the tool is rotated about its axis, and surface 132 functions as a first bearing surface bearing against the extended portion 42 of key 41 to rotate the key to a desired orientation. Rotation of the tool to the desired orientation is preferably accomplished by a stepping motor schematically illustrated at 140 which rotates the tool and, hence, the key to any one of, e.g., six possible angular orientations, as determined by programming instructions.

After the key is rotated to a desired orientation, as determined by programming instructions, support member 104 is pushed down by any suitable structure to seat the oriented key fully into connector passageway 44 to lock the key in the programmed second position within the passageway. As the support member is pushed down, forward-facing surface 106 of sleeve 101 bears against the outer surface of the connector and is prevented from moving forward. Cylindrical member 103, however, moves forward to a second extended position (as shown in tool 101*b*) to push the key into its programmed second position, thereby securing the key in the connector in a programmed orientation. Forwardly facing surfaces 113 and/or 116 function as second bearing surfaces pressing against the key to push the key into the passageway to its programmed second position. Following seating of the key, the tool is raised and spring 121 urges the cylindrical member back to its first retracted position.

Programming device 100 can be a pair of tools 101*a* and 101*b* as shown in FIG. 6 designed to operate individually or together. Alternatively, device 100 can be a single tool and either the tool or the connector can be movable within the programming station to align the tool relative to the keys.

After the keys of connector 10 have been programmed in programming station 57, gate 76, which comprises second delivery structure, (see FIG. 5D) is operated to allow the connector having programmed keys to exit the programming station and slide along inclined path 64 to the output station 58. When connector 10*a* leaves the programming station, a switch or the like is activated to cause a signal to be sent from the programming station to the supply station along signal line 70 to cause the next connector 10*b* to be delivered from the lowermost tube 67*a* to the programming station to be in position for the next key programming operation.

The output station is essentially a chute 81 (FIG. 4) along which the connector, having programmed keys, slides by gravity until a stop is encountered. Chute 81 may be of a length to receive one or more connectors. The connector, having programmed keys, is picked up from the end of chute 81 and transferred to and positioned on a utilization device 53 (FIG. 3).

If desired, a connector having programmed keys can be picked up and carried to the utilization device by hand. In accordance with a presently preferred embodiment of the invention, however, the transfer is accomplished automatically by a robotic transfer apparatus 52 (FIG. 3). More particularly, robotic transfer apparatus 52, which may be of conventional type and, therefore, need not be described in detail herein, is designed to pick up the connector having programmed keys from the end of chute 81, transfer the connector to a utilization device 53, i.e. a printed circuit board, and position the connector on the utilization device in the proper location thereon.

If desired, the keys of each connector can be programmed in the programming station in accordance with programming instructions stored in a buffer 61 within the programming station. In such an embodiment the robotic transfer apparatus simply picks up the connectors having programmed keys in the order that they are delivered to output chute 81, and delivers them to predetermined locations on the printed circuit board. It is preferred, however, that the programming device 100 be controlled from the robotic transfer apparatus via signals on line 62 (FIG. 3). By controlling the programming device from the robotic transfer apparatus, the programmed instructions can be modified, if necessary, during operation of the system. For example, a pointer in the buffer of keying instructions may not be advanced until a connector having a particular key orientation is successfully placed on the utilization device. Thus, if the robotic transfer apparatus detects that a particular connector has been dropped during the transfer step, or otherwise not properly positioned on the utilization device, the robotic transfer apparatus can instruct the programming device to program the keys of the next connector in the programming station in the same orientation as the keys of the previous connector so as to replace the improperly positioned connector.

Figure 7:
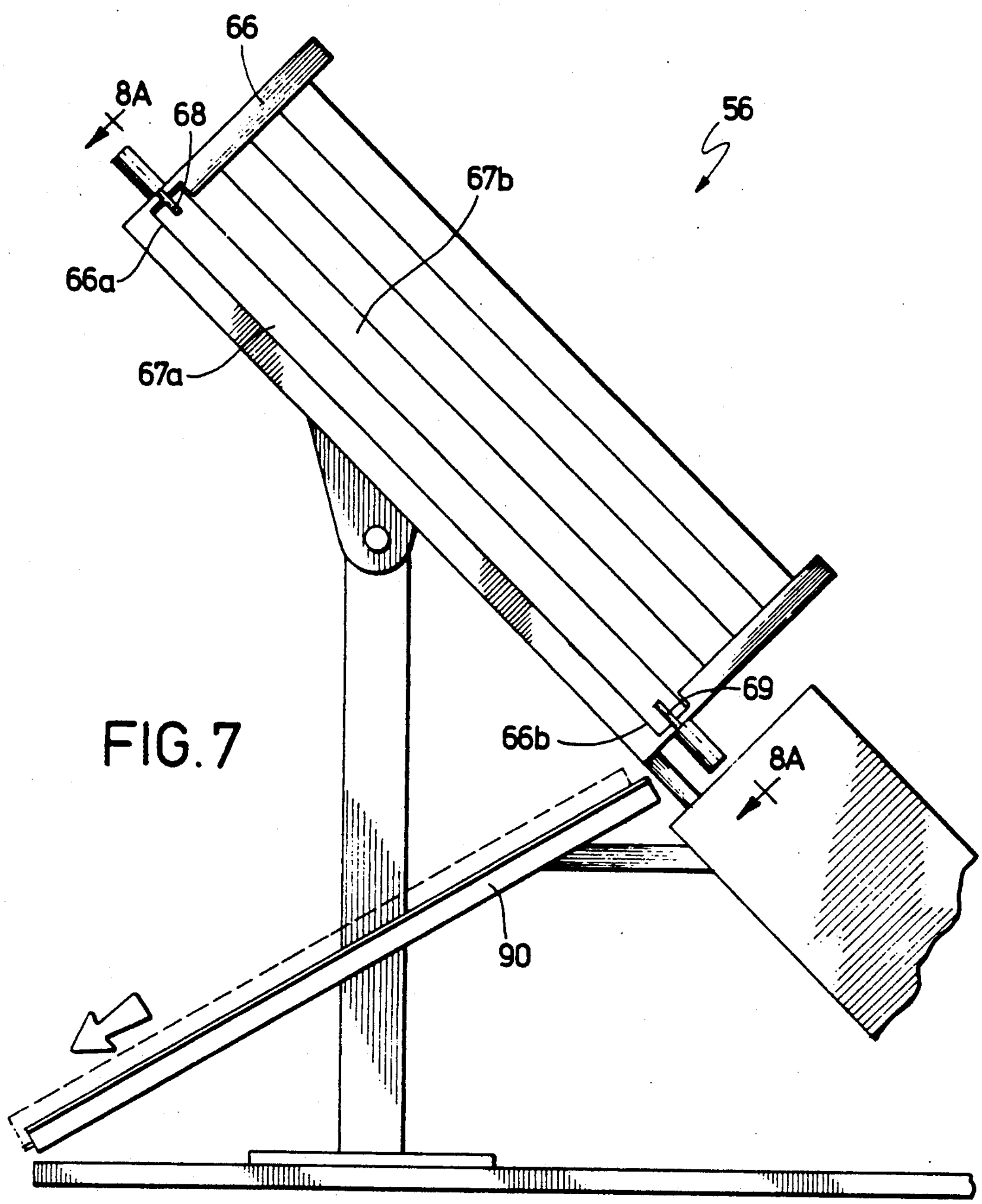
FIG. 7 is a rear view of the supply station in the automatic key programming apparatus of FIG. 4.
Figure 8A:
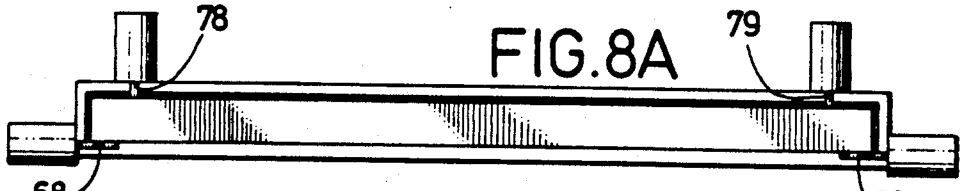
FIGS. 8A and 8B are cross-sectional views of the supply station of FIG. 7 looking in the direction of arrows 8A—8A in FIG. 7 to help explain a feature of the supply station.
Figure 8B:
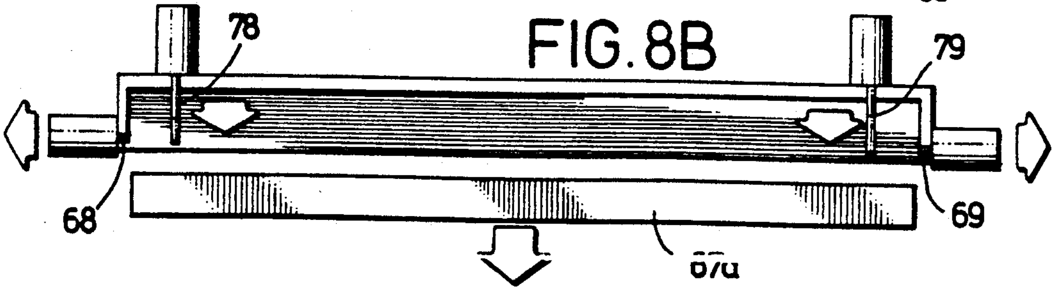

When the lowermost tube 67*a* in supply station 56 of the automatic programming apparatus 51 is empty, it is necessary to remove the empty tube from frame 66 and to move the next tube 67*b* of the stack of tubes in position to dispense connectors to the programming station. One suitable mechanism for accomplishing this is illustrated in FIGS. 7, 8A and 8B. More particularly, FIG. 7 is a rear view of supply station 56 of programming apparatus 51 to illustrate that frame 66 includes cut-out portions 66*a* and 66*b* adjacent the bottoms of the front and back walls of the frame. The cut-out portions 66*a* and 66*b* are positioned and sized to permit the lowermost tube 67*a* in the stack of tubes to be pushed laterally from the frame, while preventing any other tubes in the stack from being pushed from the frame. Withdrawal of tube 67*a*, through the cut-outs, however, is normally prevented by a pair of switch operated gates 68 and 69 which block the cut-outs as shown in FIGS. 7 and 8A.

When the lowermost tube 67*a* has been emptied, however, a signal causes gates 68 and 69 to be retracted to the positions illustrated in FIG. 8B in which the gates no longer block the cut-outs 66*a* and 66*b*. Thereafter, a pair of switch operated pusher rods 70 and 71 are actuated to push the empty tube laterally out of the frame as shown in FIGS. 8A and 8B onto a slide 90 to be carried away from the apparatus. Pusher rods 70 and 71 are thereafter retracted back to the positions shown in FIG. 8A allowing the next tube 67*b* in the stack of tubes to fall down the frame by gravity into position to deliver connectors therefrom to the programming station. Gates 68 and 69 are also returned to their FIG. 8A position blocking recesses 66*a* and 66*b* to prevent the new tube 67*b* from accidentally falling out of the frame.

With the present invention, therefore, a system is provided for automatically programming the keys of a connector, and for thereafter transferring the connectors having programmed keys to a utilization device such as a printed circuit board.

Allowance is made for programming the key of a subsequent connector in the same orientation as the next previous connector to permit replacing a connector not properly positioned on the utilization device.

In accordance with known keying techniques, when a connector has two keys, they are typically oriented in the same orientation giving a very limited number of unique key orientation combinations. This invention is not limited to programming two keys on a connector to the same key orientation. This invention may be used to program two keys on a connector to different orientations. Keying two keys on a connector, as is known in the art, results in a significantly greater number of unique key orientation combinations when compared to orienting both keys in the same orientation.

While what has been described herein comprises a presently preferred embodiment of the invention, it should be understood that the invention can take various other forms. For example, although the invention has been described primarily for use in connection with connector 10 described herein, it should be understood that the invention can be used to program the keys of a variety of connectors and transfer a variety of different connectors including connectors having keys which are adapted to be removed, added, or adjusted on a connector. Because the invention can take numerous forms, it should be understood that the invention should be limited only insofar as is required by the scope of the following claims.

I claim:

1. Apparatus for automatically programming keys of electrical connectors, comprising:

a supply station including a frame supporting a plurality of elongated tubes in a stack one above the other, each of said plurality of tubes carrying a plurality of electrical connectors having one or more keys secured thereto in an unprogrammed predetermined orientation;

a programming station including programming means for programming at least one of the one or more keys of said connectors to any one of a plurality of programmed orientations, in accordance with programming instructions applied thereto, by moving said at least one key out of the unprogrammed orientation and securing said at least one of said one or more keys in said any one of a plurality of programmed orientations;

control means for providing said programming instructions to said programming means;

an output station including means for receiving connectors having at least one of the one or more keys programmed to a desired orientation from said programming station;

first delivery means for delivering connectors having at least one of the one or more keys in an unprogrammed predetermined orientation one at a time from the lowermost tube in said stack to said programming station; and second delivery means for delivering connectors having at least one of the one or more keys programmed to a desired orientation from said programming station to said output station.

2. The apparatus of claim 1 wherein said supply station further includes tube removal means for removing the lowermost tube in said stack of tubes from said frame when said lowermost tube is empty during operation of said apparatus.

3. The apparatus of claim 2 wherein said tube removal means comprises pusher means for pushing said lowermost tube from said frame when said lowermost tube is empty.

4. The apparatus of claim 3 wherein said frame includes cut-out portions aligned with the lowermost tube in said stack of tubes, gate means normally blocking said cut-out portions to normally prevent the lowermost tube from being pushed from the frame by said pusher means, and means for operating said gate means to unblock said cut-out portions to permit said pusher means to push the lowermost tube from said frame when said lowermost tube is empty.

5. A system for programming keys of an electrical connector and for transferring the connector having programmed keys to a utilization device, said system comprising;

a supply station including means for storing a plurality of connectors having at least one key secured thereto in an unprogrammed predetermined orientation;

a programming station for receiving said connectors from said supply station, said programming station including programming means for programming the at least one key of a connector therein to any one of a plurality of programmed orientations, in accordance with programming instructions applied thereto, by moving said at least one key out of the unprogrammed orientation and securing said at least one key in said any one of a plurality of programmed orientations;

an output station including means for receiving connectors having keys programmed to desired orientations from said programming station, said supply station, said programming station and said output station being connected to one another by structure defining inclined paths to permit connectors to be delivered from said supply station to said programming station and from said programming station to said output station by gravity;

control means for providing said programming instructions to said programming means; and robotic transfer means for transferring connectors having keys programmed to desired orientations from said output station to a utilization device.

6. Apparatus for automatically programming keys of electrical connectors, comprising:

a supply station including means for storing a plurality of connectors, each of said connectors having one or more keys in an unprogrammed predetermined orientation;

a programming station including programming means for programming at least one of the one or more keys of said connectors to any one of a plurality of programmed orientations in accordance with programming instructions applied thereto;

control means for providing said programming instructions to said programming means;

an output station including means for receiving connectors having at least one of said one or more keys programmed to a desired orientation;

first delivery means connecting said supply station and said programming station to one another for delivering connectors having one or more keys in an unprogrammed predetermined orientation one at a time from said supply station to said programming station; and second delivery means connecting said programming station to said output station for delivering connectors having at least one of said one or more keys programmed to a desired orientation from said programming station to said output station, said first delivery means and said second delivery means including inclined paths to permit connectors to be delivered from said supply station to said programming station and from said programming station to said output station by gravity, said first delivery means further including a first gate operable to permit connectors having one or more keys in an unprogrammed predetermined orientation to slide out of said supply station by gravity and a second gate positioned approximately one connector length forwardly of said first gate for permitting only one connector having one or more keys in an unprogrammed predetermined orientation to slide out of said supply station at a time.

7. Apparatus for automatically programming keys of electrical connectors, comprising:

a supply station including means for storing a plurality of connectors having at least one key secured thereto in an unprogrammed predetermined orientation;

a programming station for receiving said connectors from said supply station, said programming station including programming means for programming the at least one key of a connector therein to any one of a plurality of programmed orientations, in accordance with programming instructions applied thereto, by moving said at least one key out of the unprogrammed orientation and securing said at least one of said one or more keys in said any one of a plurality of programmed orientation;

control means for providing said programming instructions to said programming means;

an output station including means for receiving connectors having one or more keys programmed to desired orientations from said programming station, said supply station, said programming station and said output station being connected to one another by structure defining interconnecting paths to permit connectors to be delivered from said supply station to said programming station and from said programming station to said output station;

first delivery means for delivering connectors along said interconnecting paths from said supply station to said programming station; and second delivery means for delivering connectors having one or more keys programmed to a desired orientation along said interconnecting paths from said programming station to said output station.

8. The apparatus of claim 7 wherein said control means includes a buffer memory in said programming station for storing said programming instructions.

9. The apparatus of claim 7 wherein said at least one key is partially inserted in said connectors, and wherein said programming means comprises a programming tool for rotating said at least one key to a desired programmed orientation while said at least one key is partially inserted in said connectors, and for thereafter locking said at least one key in said desired programmed orientation fully inserted in said connectors.

10. The apparatus of claim 9 wherein said connectors each include a pair of keys thereon, each of said pair of keys being supported within said connectors in an unprogrammed predetermined orientation partially inserted in each connector, and wherein said programming means comprises a pair of programming tools for simultaneously programming said pair of keys.

11. The apparatus of claim 7 wherein said first delivery means includes means for delivering connectors one at a time along said interconnecting paths from said supply station to said programming station.

12. The apparatus of claim 11 wherein said means for storing a plurality of connectors includes a frame supporting a plurality of elongated tubes, each of said plurality of tubes carrying a plurality of electrical connectors having one or more keys in an unprogrammed predetermined orientation therein, and wherein said first delivery means includes means for delivering connectors having one or more keys in an unprogrammed predetermined orientation one at a time from said tubes to said programming station.

13. The apparatus of claim 11 wherein said interconnecting paths comprise inclined paths to permit connectors to be delivered from said supply station to said programming station and from said programming station to said output station by gravity.

14. The apparatus of claim 13 wherein said first delivery means includes gate means operable to deliver connectors one at a time from said supply station to said programming station.

15. A system for programing keys of an electrical connector and for transferring the connector having programmed keys to a utilization device, said system comprising:

a supply station including mean for storing a plurality of connectors having at least one key secured thereto in an unprogrammed predetermined orientation;

a programming station for receiving said connectors from said supply station, said programming station including programming means for programming the at least one key of a connector therein to any one of a plurality of programmed orientations, in accordance with programming instructions applied thereto, by moving said at least one key out of the unprogrammed orientation and securing said at least one key in said any one of a plurality of programmed orientation;

control means for providing said programming instructions to said programming means;

an output station including means for receiving connectors having keys programmed to desired orientations from said programming station, said supply station, said programming station and said output station being connected to one another by structure defining interconnecting paths to permit connectors to be delivered from said supply station to said programming station and from said programming station to said output station;

first delivery means for delivering connectors along said interconnecting paths from said supply station to said programming station; and second delivery means for delivering connectors having one or more keys programmed to a desired orientation along said interconnecting path from said programming station to said output station; and robotic transfer means for transferring connectors having keys programmed to desired orientations from said output station to a utilization device.

16. The system of claim 15 wherein said control means is incorporated into said robotic transfer means and wherein said system further includes means for coupling said control means to said programming means.

* * * * *